Figure 1:
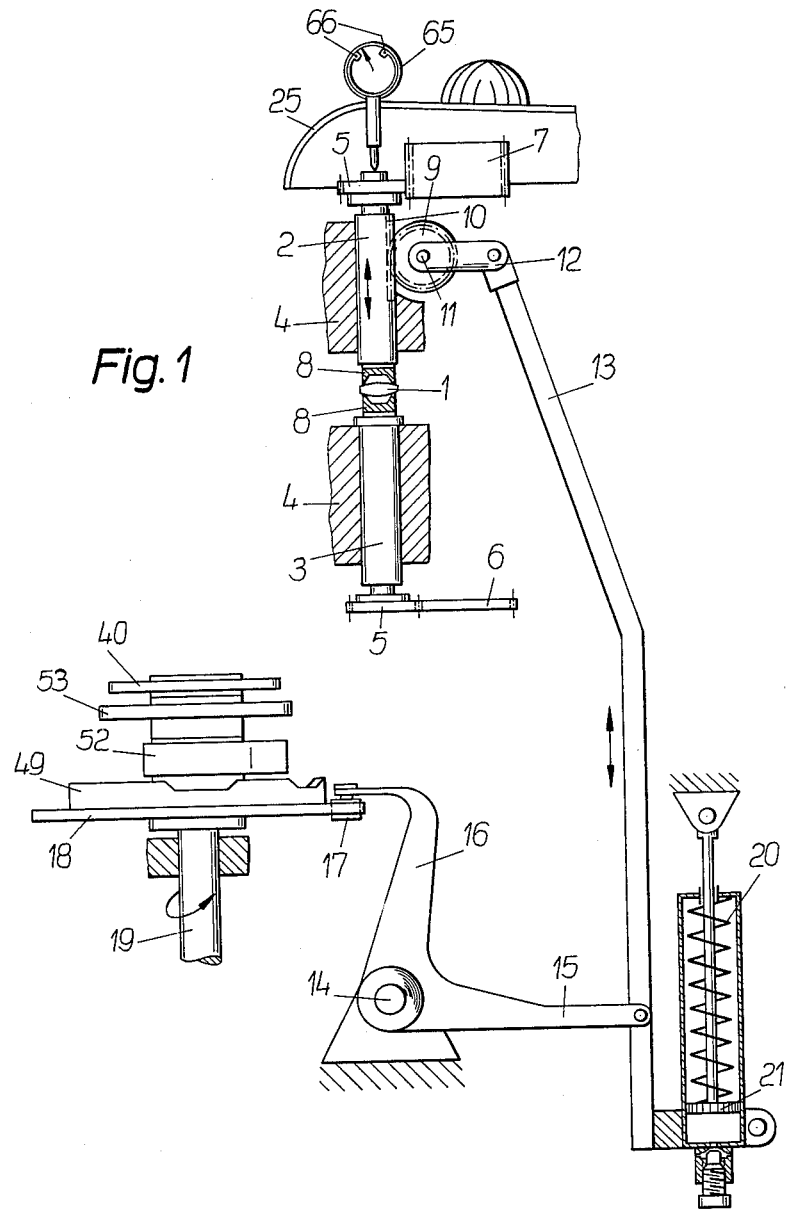

July 19, 1966  E. LOH ET AL  3,261,131
LOADING MECHANISM FOR MACHINES FOR WORKING
ON OPTICAL LENSES
Filed Dec. 16, 1964  5 Sheets-Sheet 3
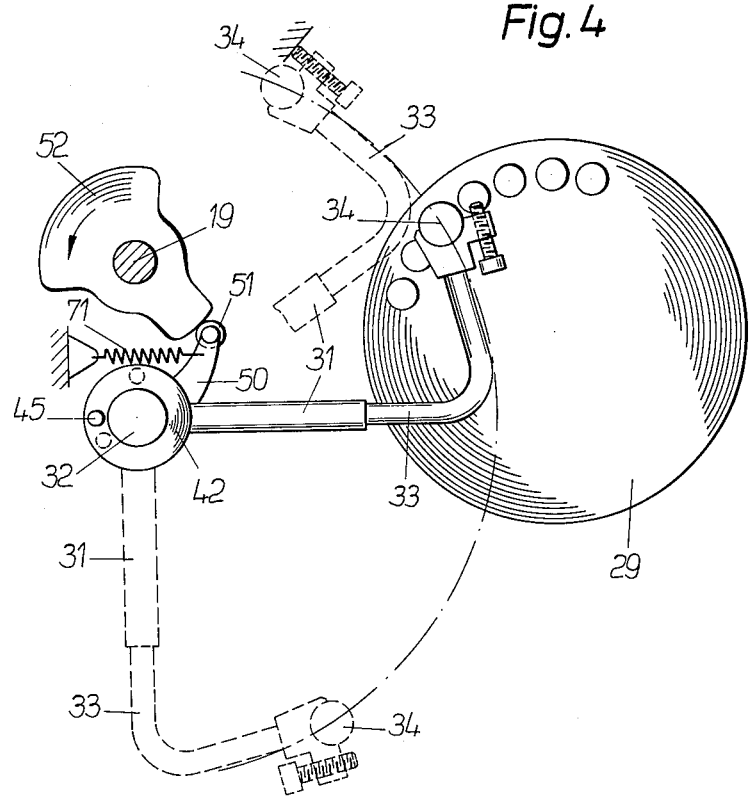
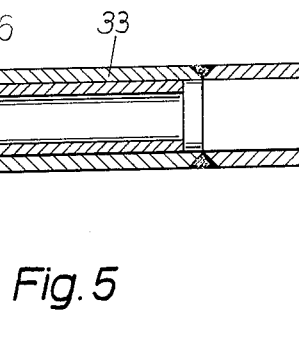
Inventors
Ernst Loh
Wilhelm Döss
By
Watson, Cole, Grindle & Watson
Attys.

July 19, 1966   E. LOH ET AL   3,261,131
LOADING MECHANISM FOR MACHINES FOR WORKING
ON OPTICAL LENSES
Filed Dec. 16, 1964   5 Sheets-Sheet 4

Inventors
Ernst Loh
Wilhelm Döll
By Watson, Cole, Grindle & Watson
Attys.

Fig. 11
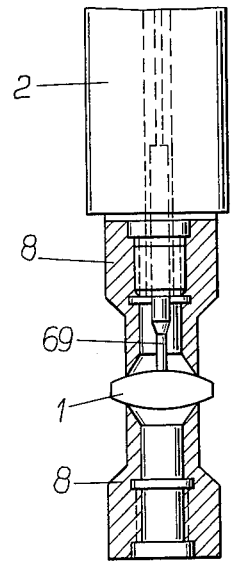
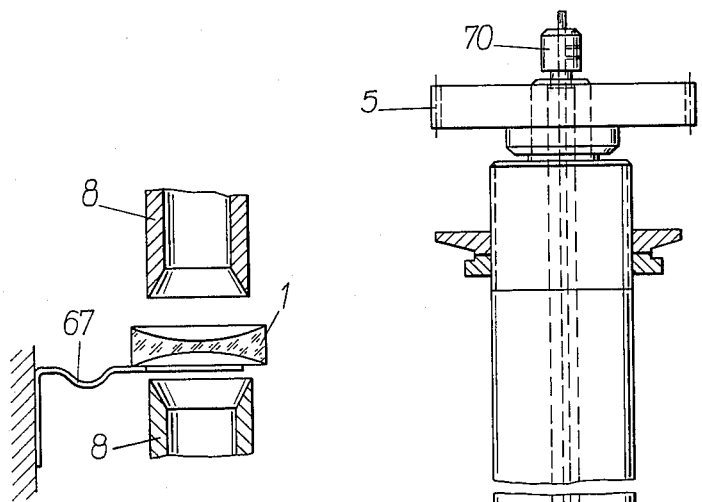
Fig. 9
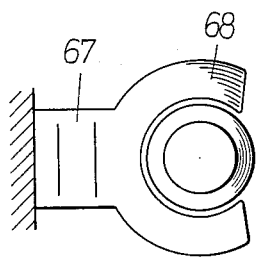
Fig. 10
Inventors
Ernst Loh
Wilhelm Döll
By Watson, Cole, Grindle & Watson
Attys.

3,261,131
LOADING MECHANISM FOR MACHINES FOR
WORKING ON OPTICAL LENSES
Ernst Loh, Wetzlar, and Wilhelm Döll, Burgsolms, Germany, assignors to Wilhelm Loh K.G., Wetzlar, Germany, a company of Germany
Filed Dec. 16, 1964, Ser. No. 418,843
Claims priority, application Germany, Dec. 18, 1963,
L 46,618
13 Claims. (Cl. 51—215)

The invention is concerned with machines for working on optical lenses and primarily with so-called centering machines, and relates to mechanism with which the lenses to be worked can be inserted into the machine in question and the worked or treated lenses can be removed from said machine. For example, in the manufacture of optical lenses, first of all the optical surfaces of the lenses are produced and only thereafter are the edges of the lenses ground and faceted. Since the center point of the lens edges must coincide accurately with the optical axis of the lens, the grinding machines serving for the machining of the edges have a centering device by which the lenses are accurately aligned according to their optical axis. The machines are for this reason designated as "centering machines."

With the said machines, the centering arrangement usualy consists of two co-axially mounted and driven tubes, of which the opposing end faces are ground to a sharp edge at an acute angle and the lens to be worked is held between them in an exactly centered position. Normally, one of the tubes is mounted for axial displacement in its driving arrangement relatively to the other in order to provide the necessary gap between the tubes for the insertion and removal of the lenses. Hitherto the insertion and removal of the lenses has taken place manually, and the switching on of the machine was a manual operation, whereas the switching off was effected automatically after the edge or rim had been ground. The invention has for its object, inter alia, to equip lens-centering machines of the aforesaid type with an automatically operating loading arrangement by which the manual insertion and removal of the lenses is avoided. The advantage is thus obtained that a larger number of machines than hitherto can be operated by a single person.

It is an object of the present invention to provide loading mechanism for a centering machine which will avoid the necessity of manually feeding the lenses between the spindles and manually removing them from between the spindles by providing automatic mechanism for effecting these operations. It is a further object of the invention to provide a movable platform on which the lenses to be machined may be brought to the automatic loading mechanism from which platform the mechanism will automatically feed the centering machine and replace the finished lenses on the platform after machining.

It is a further object of the invention to make such platform removable for the purpose of charging with lenses and discharging the lenses therefrom at a point remote from said centering machine.

It is a further object of the invention to provide lens gauging means associated with said automatic loading mechanism for preventing the machining of a lens which is not within predetermined limits.

It is a still further object of the invention to provide resilient receiving means for receiving and steadying the lens delivered automatically between the spindles whilst permitting the spindles to be brought together to grip and locate the lens to be machined.

According to the invention there is provided an automatic loading mechanism for a centering machine for the machining of lenses said machine having lens receiving spindles said mechanism comprising a frame, a movable lens receiving platform on said frame, a plurality of lens receiving stations on said platform, automatically actuable indexing means for indexing said platform to bring each station in succession to an unloading station, automatically actuable lens transporting means supported on said frame including lens grasping and releasing means carried by said lens transporting means, automatically actuable means for moving said lens grasping and releasing means to and from a receiving station positioned at said loading station and to and from the spindles of the centering machine and means for operating said grasping and releasing means and transporting means in timed sequence for causing a lens to be transported from the lens receiving station to the spindle to be machined and returning said lens to the receiving station after machining. The automatically operating loading mechanism may consist of an intermittently rotatable disc and of a removable magazine plate serving to accommodate the lenses, which plate receives both the unfinished and the finished lenses and is arranged in replaceable manner in the loading arrangement, and the transporting means may consist of a pivoted arm which carries a suction head and which can be pivoted mechanically between the axes of the spindles of the centering machine for accommodating the lenses during the finishing thereof and the axis of a receiver opening of the magazine plate and can be manually pivoted between this position and a position in which it is outside the periphery of the magazine plate and clear of said spindles.

Figure 2:
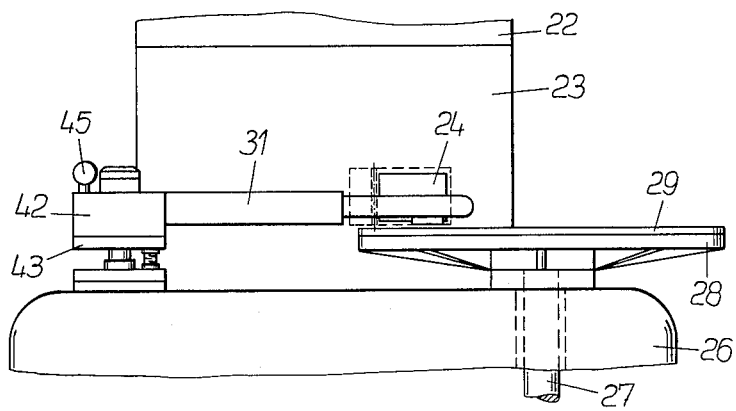
Figure 3:
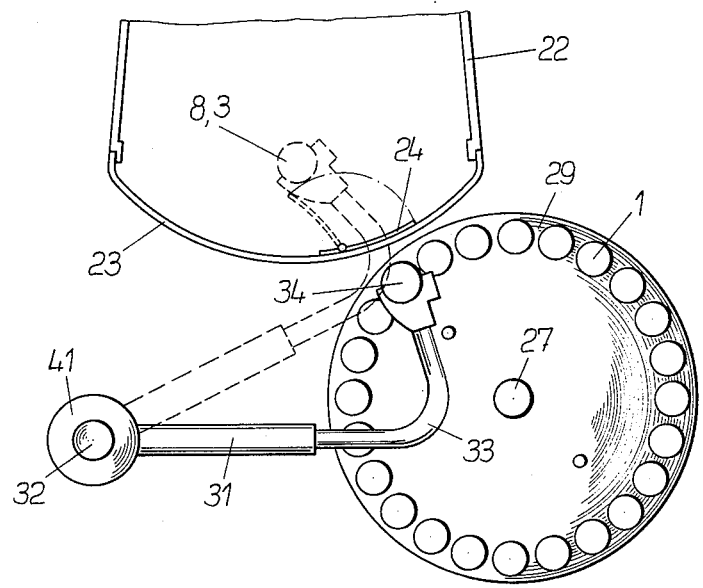
Figure 6:
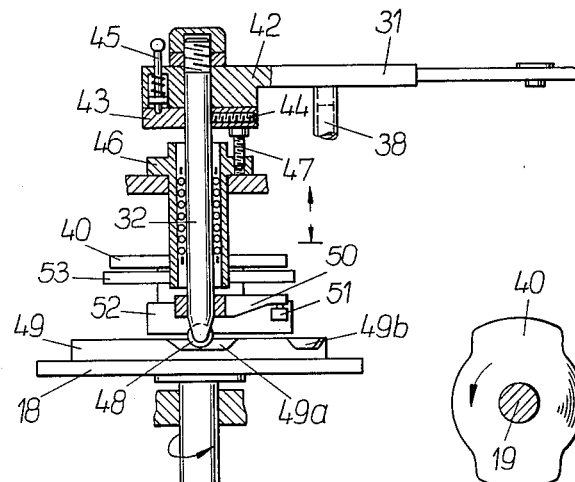
Figure 7:
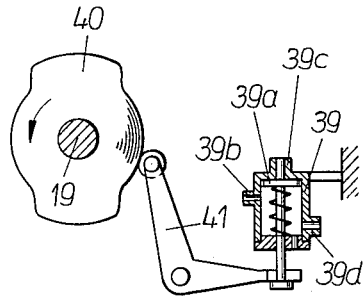
Figure 8:
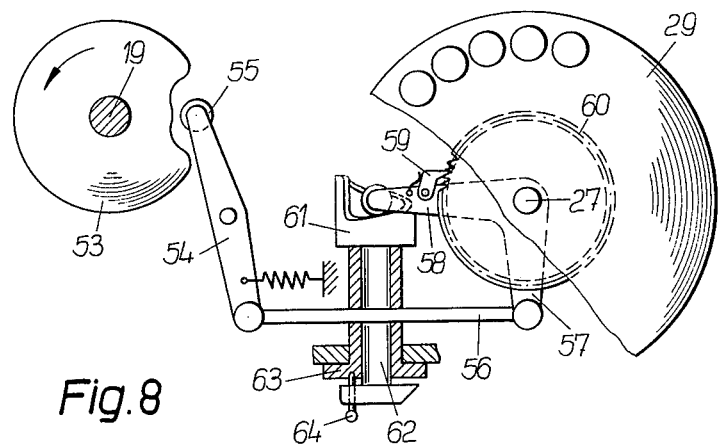

The invention and additional features thereof are hereinafter described by reference to the drawings, wherein:

FIG. 1 is an elevation of those parts of a lens-centering machine which are essential for the invention, in conjunction with the cam discs controlling the loading arrangement and a device for lifting one tube of the centering means, FIGS. 2 and 3 are respectively an elevation and plan view of the loading arrangement with magazine plate, FIG. 4 shows 3 working positions of the loading arrangement, FIG. 5 is a section through the suction head of the pivoted arm of the loading arrangement, FIGS. 6 and 7 show details of the control means for the loading arrangement, FIG. 8 shows the feeding device for the magazine plate, FIGS. 9 and 10 show in elevation and plan view an auxiliary means for accommodating the lens between the centering means and FIG. 11 is a stripper device for the lenses in conjunction with the centering means.

In FIG. 1, the two spindles of the centering machine which serve to enter the lenses 1 are indicated at 2 and 3. They are coaxially mounted for rotation in diagrammatically indicated bearings 4 of the lens-centering machine. Each spindle carries a toothed wheel 5 at its outermost end and the two toothed wheels 5 are synchronously driven by the toothed wheels 6 and 7, respectively. Each spindle carries a centering tube 8, of which the end face is ground at an acute angle. The end edges of both tubes 8 cause the centering and holding of the lenses 1. The spindle 2 can be raised and lowered, it being possible for the toothed wheel 5 to be displaced in the toothed wheel 7 which is made wide enough for this to be done without disengagement. Serving for the displacement of the spindle 2 which is formed as a rock 10, the toothed wheel 9 is mounted on a fixed shaft 11. Pivotable about the latter and fixedly connected to the toothed wheel 9 is a fork 12, which can be rocked about a certain angle by a rod 13 against the force of a spring 20. Serving to drive the rod is a double-armed lever, which is pivotable about a fixed shaft 14. The arm 15 of the lever is connected to the rod 13 and the arm 16 carries a roller 17 which is controlled by a cam disc 18. This disc is mounted on a shaft 19 driven by a motor (not shown). With each revolution of the shaft 19, the lever 15, 16, is swung outwardly once in a clockwise direction. The toothed wheel 9 is then rotated about the shaft 11 in such a way that it lifts the spindle 2, i.e. the lens 1 is freed. When the cam disc 18 again releases the roller 17 of the lever arm 16, the spindle 2 drops under the action of the spring 20. This downward movement is damped by a device 21 consisting of a cylinder and piston, the said device being oscillatably suspended from a fixed point of the machine housing and also receiving the spring 20.

In FIGS. 2 and 3, the reference 22 indicates a part of the machine housing which is covered by a transparent cap 23. Hinged to the inside of the cap is a pivoted window 24, which is held by a spring in the closed position. The spindles 2 and 3 are arranged in the housing part 22. A housing cover 25 which covers the housing part 22 is shown in FIG. 1. FIG. 3 shows the centering tube 8 of the spindle 3. Rotatably mounted in a housing part 26 of the machine is a spindle 27 which carries a disc 28 above the housing 26; it forms the support for a magazine plate 29. The disc 28 has guide pins and the magazine plate has corresponding holes, so that it can always be positioned coaxially of the axis of the shaft 27 on the support 28 and at a certain angular position to the latter. The magazine plate has a large number of openings which, as shown in FIG. 5, accommodate small bushings 30. Each bushing has a shoulder formed by turning and it is on these shoulders that the lenses 1 rest.

A pivoted transfer arm shown at 31 and pivotable about a pin 32 serves for removing the lenses 1 from the bushings 30 of the magazine plate, for transporting the lenses into a position coaxial with the spindles 2 and 3, for removing the finished lenses from the centering tube 8 of the spindle 3 and for depositing the lenses in the magazine plate. The pivoted arm 31 is composed of two tubes. The forward end consists of a tube 33 bent over at an acute angle and carrying a suction head 34, which is shown in section in FIG. 5. The suction head comprising a bore 35 is interchangeably connected by a tube 36 to the tube 33. Following the bore 35, it has a conical bore 37 into which the lens 1 is drawn by suction when there is a vacuum in the bore 35. The pivoted arm 31 communicates for this purpose, through a flexible pipe 38 and a control valve 39, with a vacuum pump (not shown). The control valve 39 of the pump (FIG. 7) is controlled by a cam disc 40 on the shaft 19 through a double-armed lever 41, as will hereinafter be further described. The pivoted arm 31 with its hub 42 is arranged on a disc 43, which is secured by a grub screw 44 (FIG. 6) to the pin 32 so as to rotate therewith. The position of the pivoted arm 31 relatively to the disc 43 is fixed by a spring-loaded pin 45. The adjustable setting of the disc 43 relatively to the pin or pivot 32 has the purpose of enabling the pivoted arm 31 to co-operate with magazine plates 29 having differing pitch circle diameters.

The pivot pin 32 is axially displaceable and rotatably mounted in a fixed sleeve 46 (FIG. 6) and supported through the disc 43 on a threaded pin or stud 47, which is fixed in the sleeve 46. The pivot pin 32 carries at the lower end a roller 48 which can be lifted by a cam disc 49. This cam disc is also fixed on the shaft 19 and is disposed above the cam disc 18. As the shaft 19 rotates, the pivot pin 32 is raised and lowered. A lever 50 (FIG. 4) with a roller 51 is fixed on the pin 32. It slides on the periphery of a cam disc 52, which is likewise fixed on the spindle 19. The cam disc 52 is shown in FIG. 4.

The shaft 19 also has arranged thereon a cam disc 53 (FIG. 8) which, through a double-armed lever 54 with a roller 55 and a rod 56, pivots a double-armed lever 57 which carriees on its free lever arm 58 a pawl 59 for advancing a toothed wheel 60. This toothed wheel is mounted on the spindle 27, which carries the disc 28 with the magazine plate 29. With each revolution of the cam disc 53 and the shaft 19, the toothed wheel 60 is advanced by a predetermined angle, which is adjustable. It is only the end position of the pawl 59 which is determined by the cam disc 53, while its initial position is determined by a tubular cam 61. This is mounted on a shaft 62, which is adjustable by rotation in a tube 63. Its angular position relatively to the fixed tube 63 can be set by a detent pin 64. The possibility is thus provided of being able to turn the support 28 with its toothed wheel 60 through different angular values, corresponding to the number of lenses accommodated by the magazine plate 29. As can be seen in FIG. 1, a gauge 65 is fixed on the housing part 25 and the feeler pin thereof is supported on the upper end of the spindle 2. The thickness of the lens 1 can be checked by means of this gauge. If the thickness differs from that which is prescribed, the gauge prevents the grinding operation. For this purpose, the gauge has contacts at the adjustable tolerance indexes 66, the said contacts being in the control circuit of the driving motor of the machine and preventing a starting thereof when it is actuated by the pointer. The lens 1 is then extracted from the machine and is deposited on the magazine plate. In this way, the machining of lenses unsuitable for use is avoided.

As can be seen from FIGS. 9 and 10, the machine frame has fixed thereon a leaf spring 67 which forms in its front part a ring segment 68, the inner diameter of which is somewhat larger than the diameter of the centering tube 8. This leaf spring serves to support the lenses deposited by the loading arrangement and in fact those lenses which are made concave and which show a ready tendency to tilt when directly positioned on the centering head 8, and this they are not able to do on the ring segment 68. With the downward movement of the spindle 2, the lens 1 is moved downwardly together with the spring 67. Thus, the lens rests without tilting on the centering tube 8. As shown in FIG. 11, an ejector pin 69 is mounted to be movable axially in the spindle 2, its lowermost position being defined by a stop 70. The pin 69 rests on the lens 1. With the lifting of the spindle 2 it lags somewhat relatively to the lens and thus effects a reliable separation of the lens 1 from the top tube 8.

The operation of the loading arrangement is as follows:

The pivoted arm 31 is initially in the position shown in broken lines, in which it is situated outside the plate 28 (FIG. 4). In this position, a magazine plate 29 filled with lenses is positioned on the plate 28. The disc 43 is so adjusted relatively to the pivot pin 32 that when the pivoted arm 31 is swung inwardly by hand, the axis of the suction head 34 and also the axis of the cone 37 coincide with the axis of one of the bushings 30 of the magazine plate 29. In this position the spindle is lifted by the lever 15, 16. If now the motor driving the shaft 19 is switched on, the roller 48 of the pin 32 enters the first of the four cut-outs 49a of the cam disc 49 (FIG. 6) i.e. the suction head 34 moves downwardly a little until it assumes the position shown in FIG. 5. Simultaneously or immediately following this movement, the cam disc 40 rocks the double-armed lever 41 in clockwise direction and the valve plate 39a (FIG. 7) is moved downwardly. The pipe connection 39b leading to the pivoted arm 31 is connected to the suction pipe 39c of the vacuum pump. A vacuum is set up in the bore 35 and this vacuum draws the lens 31 into the cone 37. Immediately thereafter, the roller 48 leaves the first cut-out or recess 49a, i.e. the suction head is raised. The cam disc 52 then frees the roller 51, so that the pivoted arm 31 pivots inwardly under the action of the spring 71 (FIG. 4), strikes against the window 24 (FIG. 3) opens the window and brings the lens 1 into a position coaxial with the tubes 8. When this position is reached, the roller 48 drops into the second recess 49b of the cam disc 49. Simultaneously, the cam disc 40 frees the valve plate 39a and it again assumes the position shown in FIG. 7. In this position, a super-atmospheric pressure is supplied to the head 34 by the vaccum pump through the union 39b, i.e. the lens 1 drops and as a result takes up a position on the ring segment 67 above the lower centering tube 8 of the spindle 3. The pivoted arm 31 is again raised and is once again moved outwardly into the position shown in FIG. 4 by the cam disc 52 against the force of the spring 71. As a result, the window 24 is closed again. This is important, in order to prevent soiling of the magazine plate by oil and grinding dust.

During the outward movement of the pivoted arm, the lever 15, 16 is released, the spindle 2 with its centering tube 8 moves downwardly and presses the lens 1 on to the centering tube 8 of the spindle 3, centers it and holds it fast. After reaching this position, the motor of the shaft 19 is switched off, the motor of the machine is switched on and the grinding disc itself moves towards the rim of the lens. The lens rotates with the tube 8, and its rim is ground and faceted. The motor of the shaft 19 is switched on automatically again after completing the grinding operation. The cam disc 18 rocks the lever 15, 16 in a clockwise direction, i.e. the spindle is lifted. During the lifting of the spindle 2, the ejector pin 69 holds the lens 1 in engagement with the centering tube 8 of the spindle 3, until the lens has been reliably detached from the upper centering tube 8 and then the pin 69 follows the upward movement of the spindle 2.

The pivoted arm 31, which is freed from the cam disc 52, now pivots again between the spindles 2 and 3. Simultaneously, the roller 48 enters the third recess 49c of the cam disc 49 and the head 34 is lowered. Thereupon, the valve plate 39a is again moved downwardly by the cam disc 40, i.e. the suction head 34 is connected to the suction pipe of the vacuum pump. The lens is drawn by the suction head 34 into the cone 37. The pivoted arm 31 is then lifted again and swung outwardly. When it has reached its position above the bushing 30 from which it had previously taken the lens, the roller 48 drops into the fourth recess 49d of the cam disc 49 and the valve is reversed again, i.e. the bore 35 is connected to the pressure pipe of the vacuum pump and the lens 1 drops into the bushing 30. Thereafter, the pivoted arm 31 is again lifted. In this position, the lever 54 is moved in a clockwise direction by the cam disc 53. This movement is transmitted by the rod 56 to the lever arm 58, i.e. the pawl 59 advances the magazine plate by one graduation, so that with the next working cycle, the next following lens is lifted by the suction head 34.

As will be seen from FIG. 4, the suction head 34 has fixed thereon a setting screw 72 which, in combination with a fixed stop in the machine, permits the accurate setting of the coaxial position of the suction head relatively to the centering tubes 8.

The loading arrangement made according to the invention as above described has several advantages; it can be controlled exclusively by means of cam discs and thus mechanically, and it is very simple in its design and operation, because the lenses to be finished are inserted together with the magazine plate into the loading arrangement and the finished lenses can be removed together with the magazine plate from the arrangement. It is therefore not necessary for the lenses to be inserted separately in the loading arrangement and similarly removed therefrom. At the same time, the magazine plates facilitate the transport of the lenses.

What we claim and desire to secure by Letters Patent is:

1. An automatic loading mechanism for a centering machine for the machining of lenses said machine having lens receiving spindles said mechanism comprising a frame, a movable lens receiving platform on said frame, a plurality of lens receiving stations on said platform, automatically actuable indexing means for indexing said platform to bring each station in succession to an unloading station, automatically actuable lens transporting means supported on said frame including lens grasping and releasing means carried by said lens transporting means, automatically actuable means for moving said lens grasping and releasing means to and from a receiving station positioned at said loading station and to and from the spindles of the centering machine and means for operating said grasping and releasing means and transporting means in timed sequence for causing a lens to be transported from the lens receiving station to the spindle to be machined and returning said lens to the receiving station after machining.

2. Mechanism according to claim 1 wherein said lens receiving platform is circular and is removably supported on a shaft coupled to said indexing means.

3. Mechanism according to claim 1 wherein said lens transporting means is manually movable to a position away from the transporting path and clear of said platform.

4. An automatic loading mechanism for a centering machine for the machining of lenses said machine having lens receiving spindles said mechanism comprising a frame, a movable lens receiving platform on said frame, a plurality of lens receiving stations on said platform, automatically actuable indexing means for indexing said platform to bring each station in succession to an unloading station, automatically actuable lens transporting means supported on said frame including lens grasping and releasing means carried by said lens transporting means, automatically actuable means for moving said lens grasping and releasing means to and from a receiving station positioned at said loading station and to and from the spindles of the centering machine, means for operating said grasping and releasing means and transporting means in timed sequence for causing a lens to be transported from the lens receiving station to the spindle to be machined and returning said lens to the receiving station after machining, wherein said lens grasping and releasing means comprises a suction head and the automatic actuation is effected by pneumatic control means connected therewith.

5. Mechanism according to claim 1 wherein the spindles are enclosed by a cover and a window is provided in said cover to give access to said transporter means.

6. Mechanism according to claim 1 wherein gauge mechanism is provided which is associated with said spindles and with the transport mechanism to return a lens to said platform which is not within the required dimensional limits.

7. Mechanism according to claim 1 wherein at least one of said spindles is provided with pin means axial of said spindle for use in separation of the lens from the spindle after grinding.

8. An automatic loading mechanism for a centering machine for the machining of lenses said machine having vertical lens receiving spindles said mechanism comprising a frame, a movable lens receiving platform on said frame a plurality of lens receiving stations on said platform automatically actuable indexing means for indexing said platform to bring each station in succession to an unloading station, automatically actuable lens transporting means supported on said frame including lens grasping and releasing means carried by said lens transporting means, automatically actuable means for moving said lens grasping and releasing means to and from a receiving station positioned at said loading station and to and from the spindles of the centering machine, means for operating said grasping and releasing means and transporting means in timed sequence for causing a lens to be transported from the lens receiving station to the spindle to be machined and returning said lens to the receiving station after machining and a resilient withdrawable segmental ring shaped lens receiving and supporting means above the lower spindle and associated projecting and withdrawing means for locating said ring segment above said lower spindle when said lens is delivered and removed and means for withdrawing said ring segment during machining.

9. An automatic loading mechanism for a centering machine for the machining of lenses said machine having vertical lens receiving spindles said mechanism comprising a frame, a removable lens receiving circular magazine plate, a plurality of equally spaced bushed lens receiving apertures in said plate arranged on an arc a spindle mounted rotatable disc for receiving and supporting said plate said spindle being supported in bearing in said frame, automatic ratchet operated indexing means for indexing said plate step by step through the angle subtended by the centers of two adjacent bushes, a transporting swinging arm mounted on a vertical pivot supported in said frame and movable over one said bush and between said spindles, an automatically actuable pneumatic vacuum head on said arm for grasping and releasing a lens positioned on said bush, means for effecting the automatic swinging of said arm and connecting and disconnecting said head with a pneumatic line in timed sequence with the operation of said centering machine, spring receiving and supporting means having a ring segment head and means for positioning said head above the lower spindle whilst said spindles are separated to receive a lens.

10. Mechanism according to claim 1 wherein the transporting means comprises a pivoted arm having means for adjusting the height of the lens grasping and releasing means above the platform.

11. Mechanism according to claim 4 wherein the suction head has a conical bore for receiving the lenses.

12. Mechanism according to claim 4 wherein the suction head is detachable and has a conical bore for receiving the lenses.

13. Mechanism according to claim 9 wherein the means for operating said ratchet, swinging said transporting arm and disconnecting and connecting said head with a pneumatic line comprises a plurality of cams on a common shaft associated with cam followers coupled by suitable mechanism to the respective ratchet swinging arm and pneumatic valve.

References Cited by the Examiner
UNITED STATES PATENTS 2,130,235    9/1938    Heyman _____ 83—152
2,933,863    4/1960    Doll _____ 51—237

OTHER REFERENCES 1,757,026, November 1957, German Gerbrauchmuster (Loh).

ROBERT C. RIORDON, *Primary Examiner.*

L. S. SELMAN, *Assistant Examiner.*